United States Patent [19]

Loftus et al.

[11] 4,146,218
[45] Mar. 27, 1979

[54] DOCUMENT COUNTER

[75] Inventors: Peter J. Loftus, Levittown, Pa.; John A. DiBlasio, Pennsauken, N.J.

[73] Assignee: Brandt-PRA, Inc., Cornwells Heights, Pa.

[21] Appl. No.: 797,450

[22] Filed: May 16, 1977

Related U.S. Application Data

[62] Division of Ser. No. 618,280, Sep. 30, 1975.

[51] Int. Cl.² .......................................... B65H 31/26
[52] U.S. Cl. .................................................. 271/220
[58] Field of Search .............. 271/177, 182, 188, 209, 271/220, 223, 224

[56] References Cited

U.S. PATENT DOCUMENTS

| | | | |
|---|---|---|---|
| 1,887,023 | 11/1932 | Hunziker | 271/220 X |
| 2,916,286 | 12/1959 | Keating | 271/220 |
| 2,991,999 | 7/1961 | Doerner | 271/220 |
| 3,739,925 | 6/1973 | Martin | 271/220 X |

FOREIGN PATENT DOCUMENTS

| | | | |
|---|---|---|---|
| 1181132 | 11/1964 | Fed. Rep. of Germany | 271/224 |
| 2022565 | 5/1970 | Fed. Rep. of Germany | 271/220 |
| 789015 | 1/1958 | United Kingdom | 271/220 |

*Primary Examiner*—Richard A. Schacher
*Attorney, Agent, or Firm*—Lerner, David, Littenberg & Samuel

[57] ABSTRACT

Apparatus for feeding, separating, counting and stacking documents at high speed.

6 Claims, 30 Drawing Figures

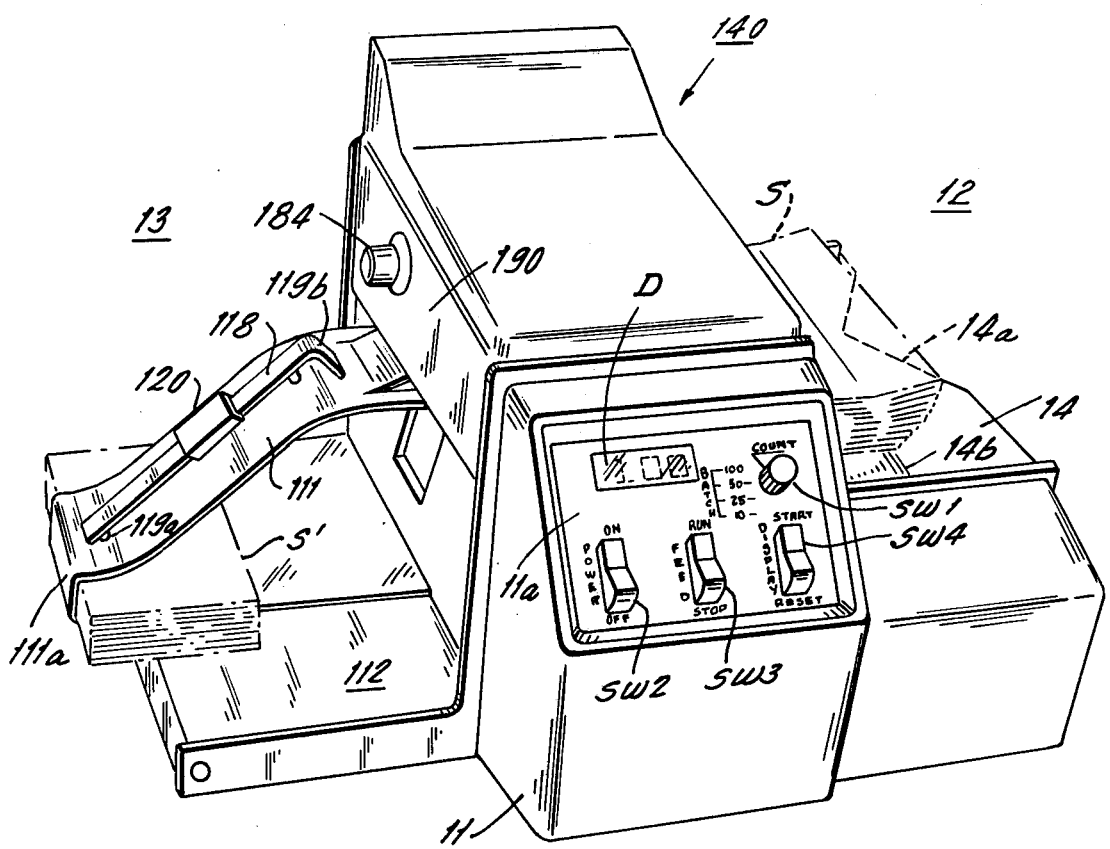
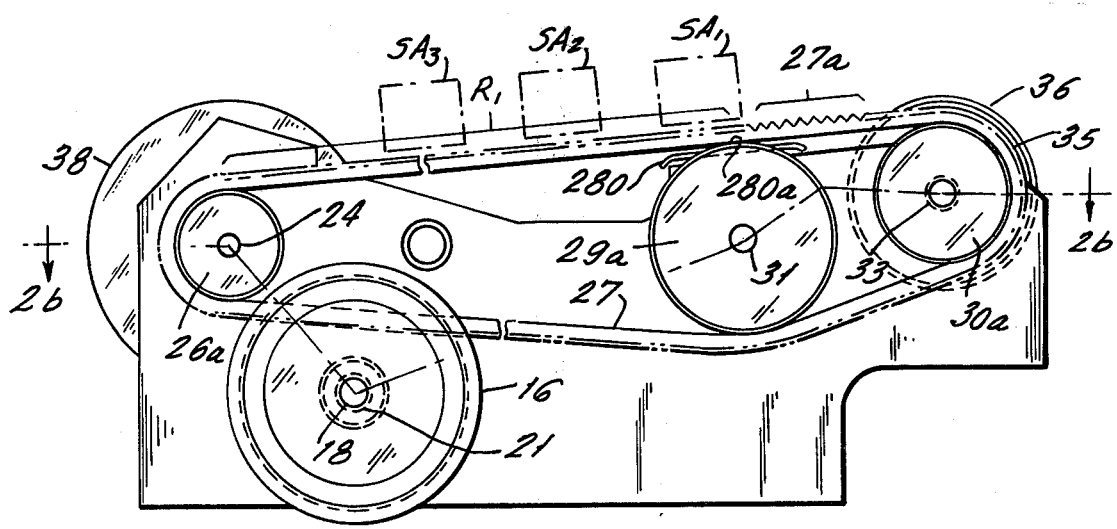

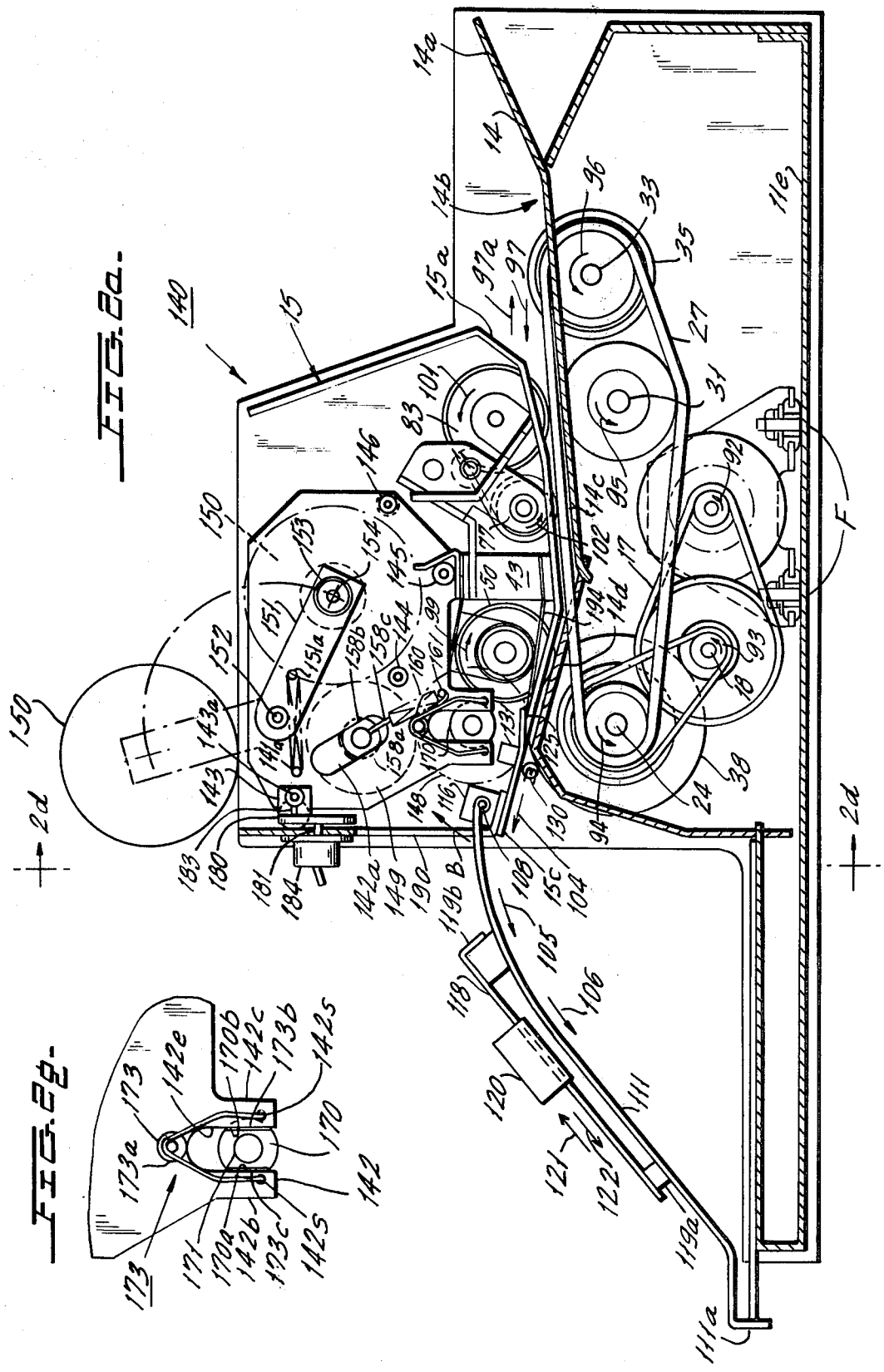

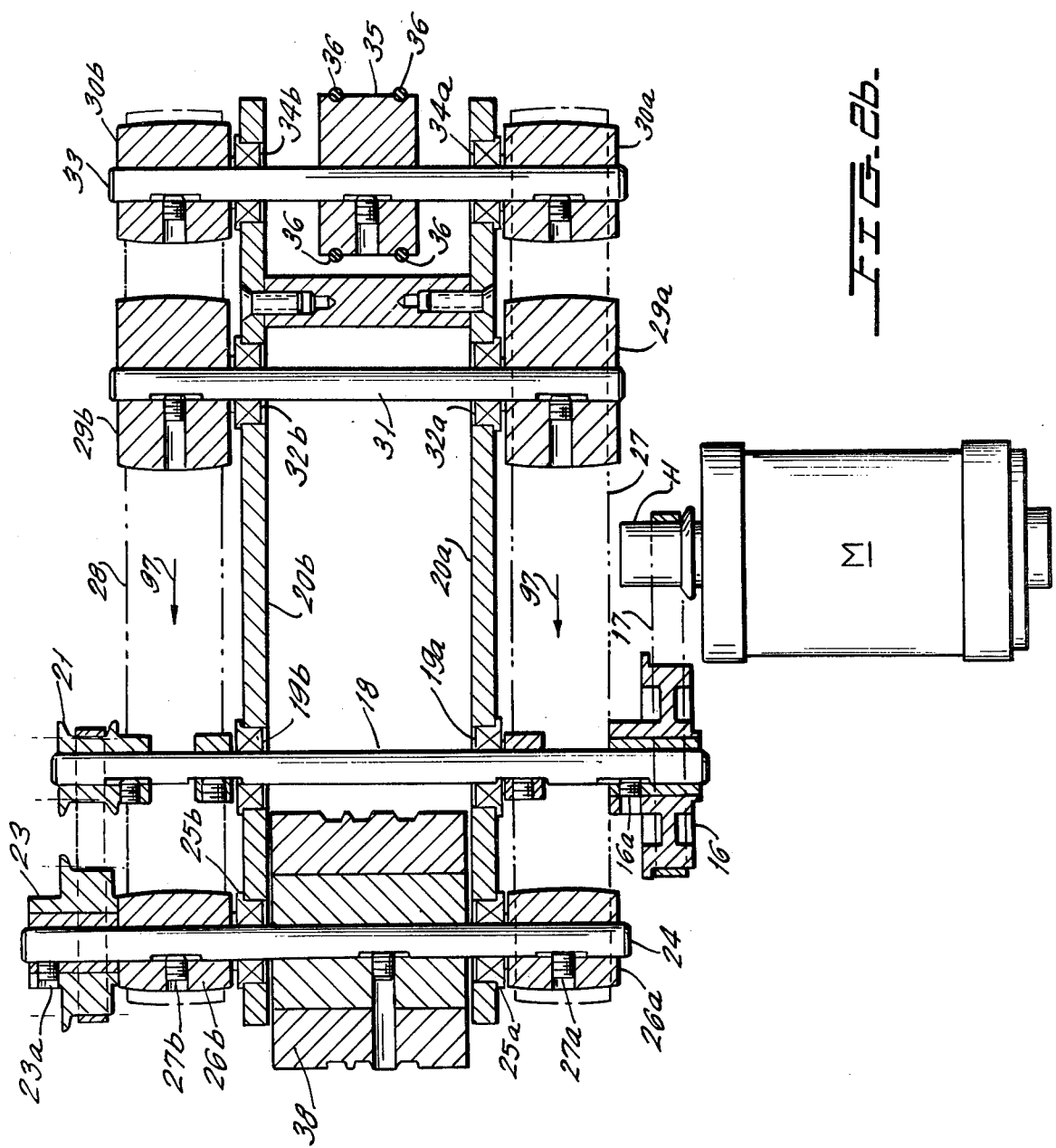

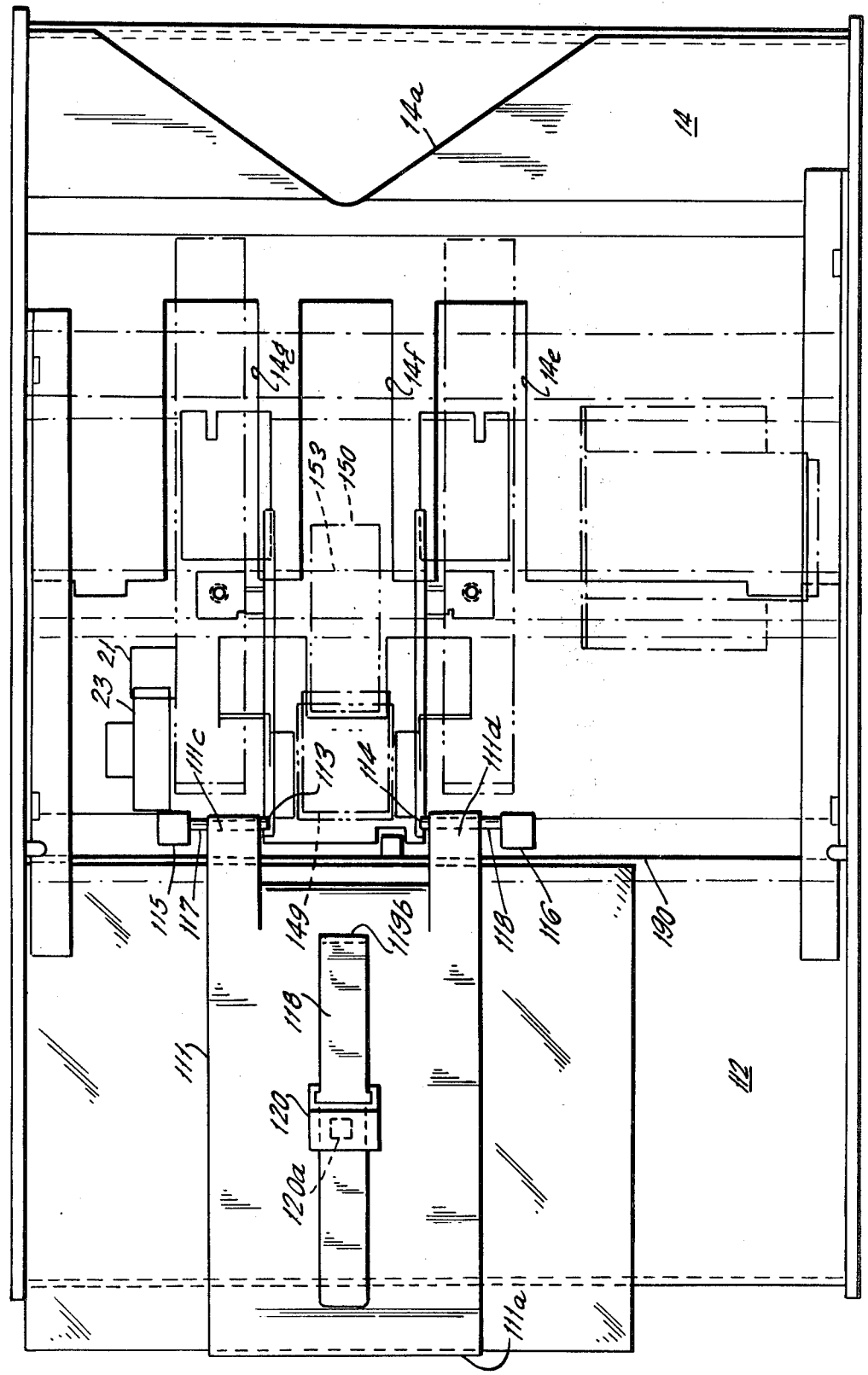

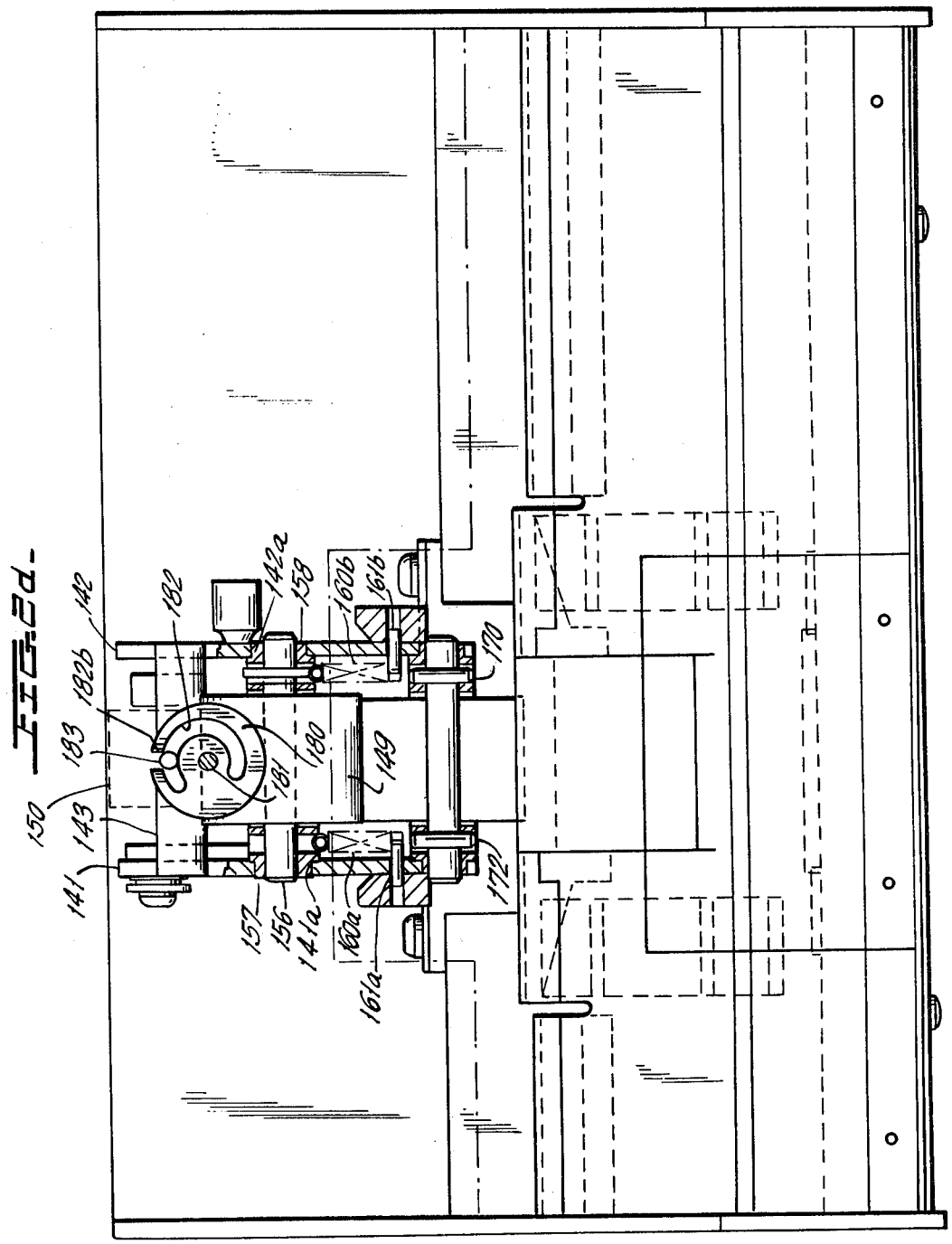

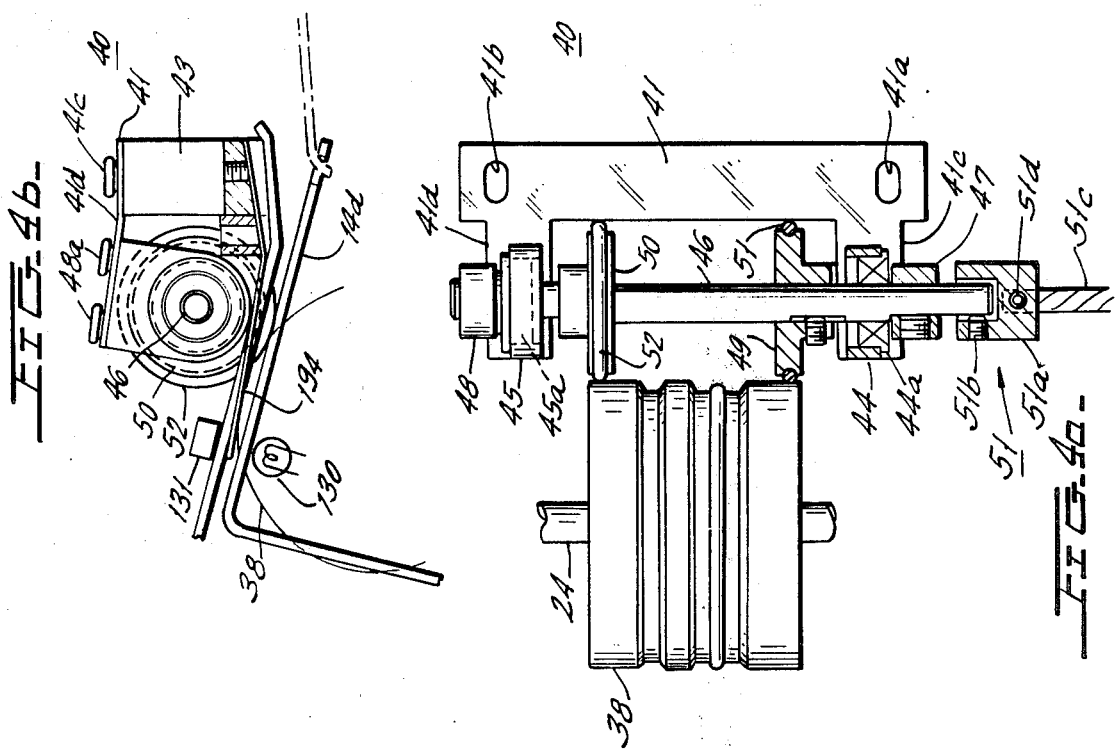
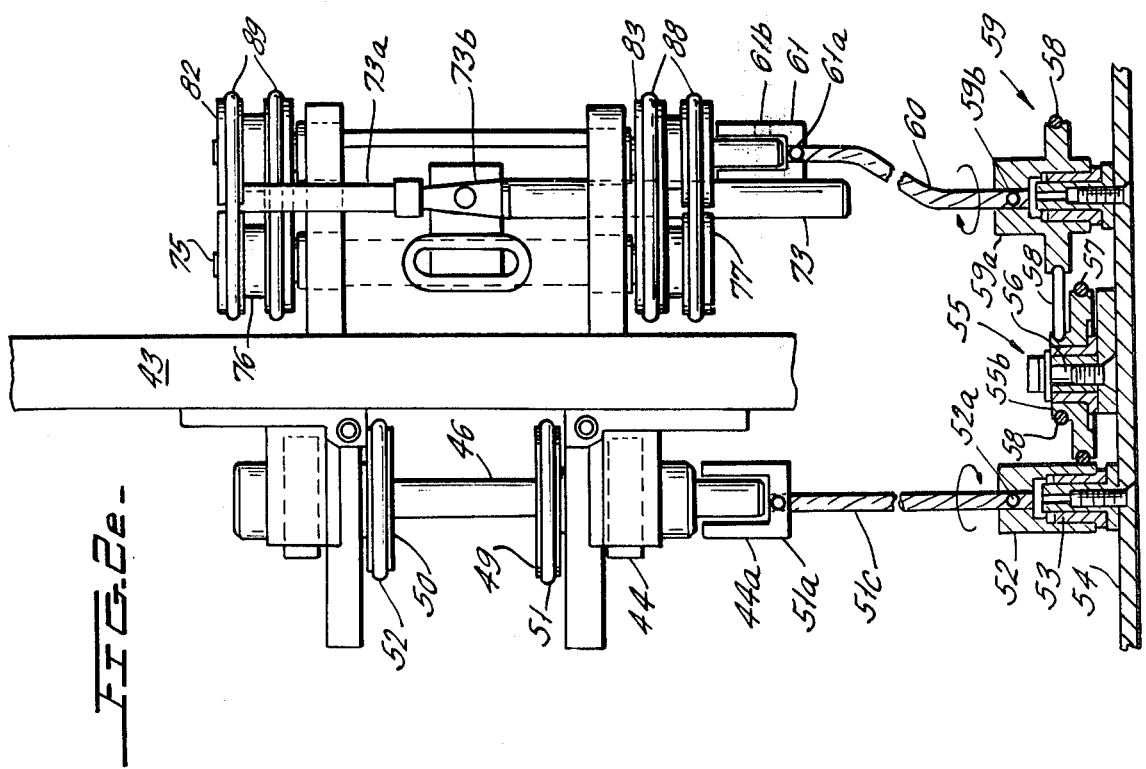

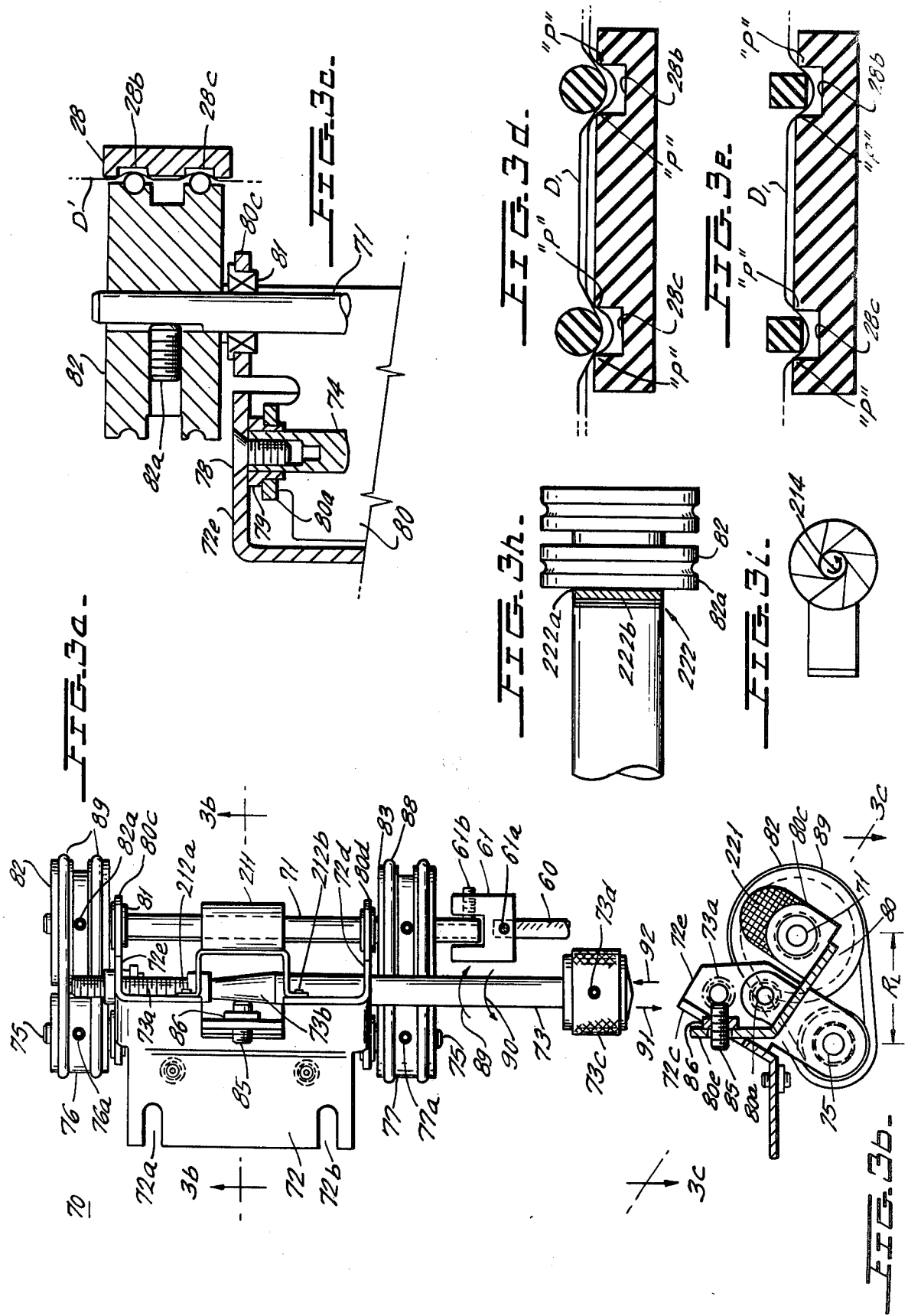

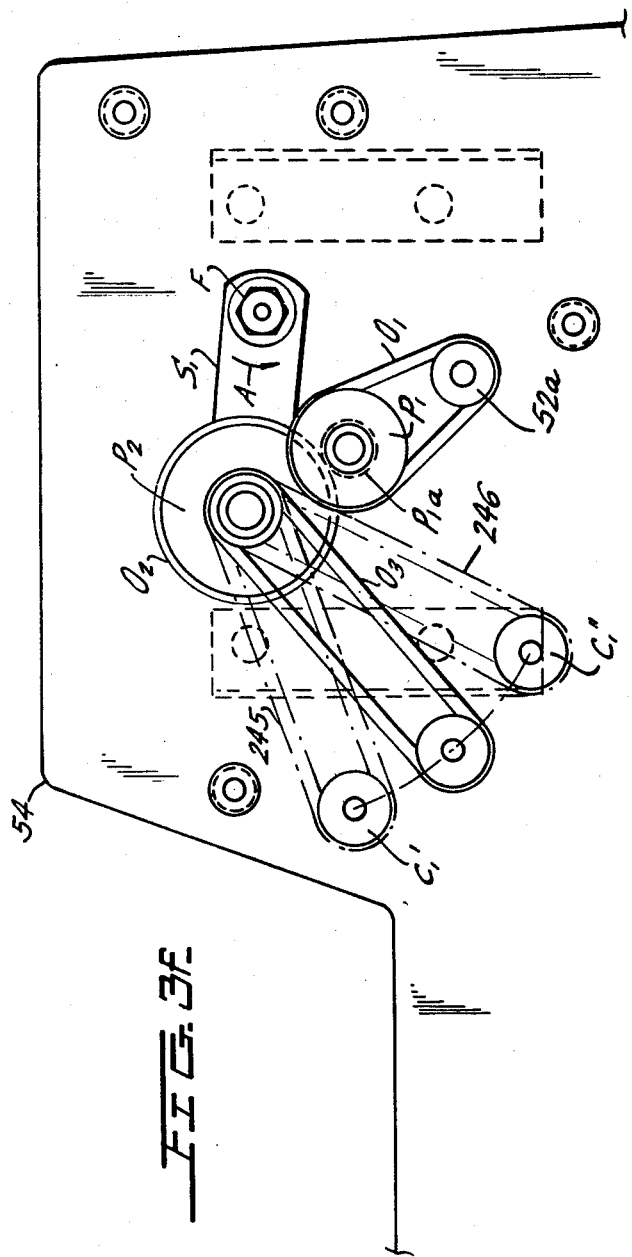
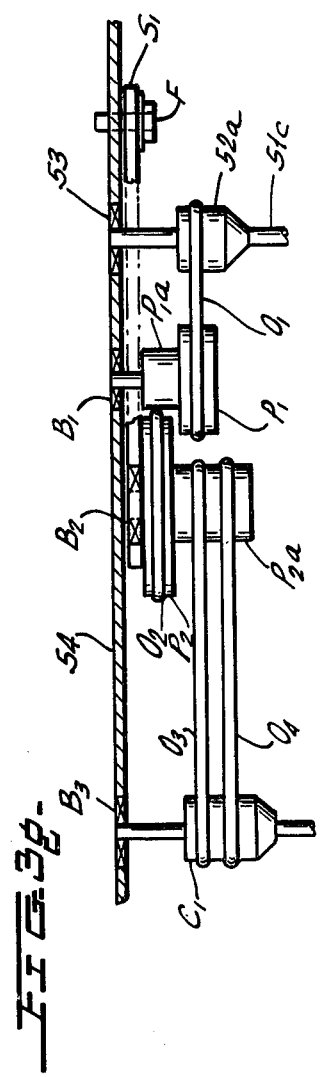

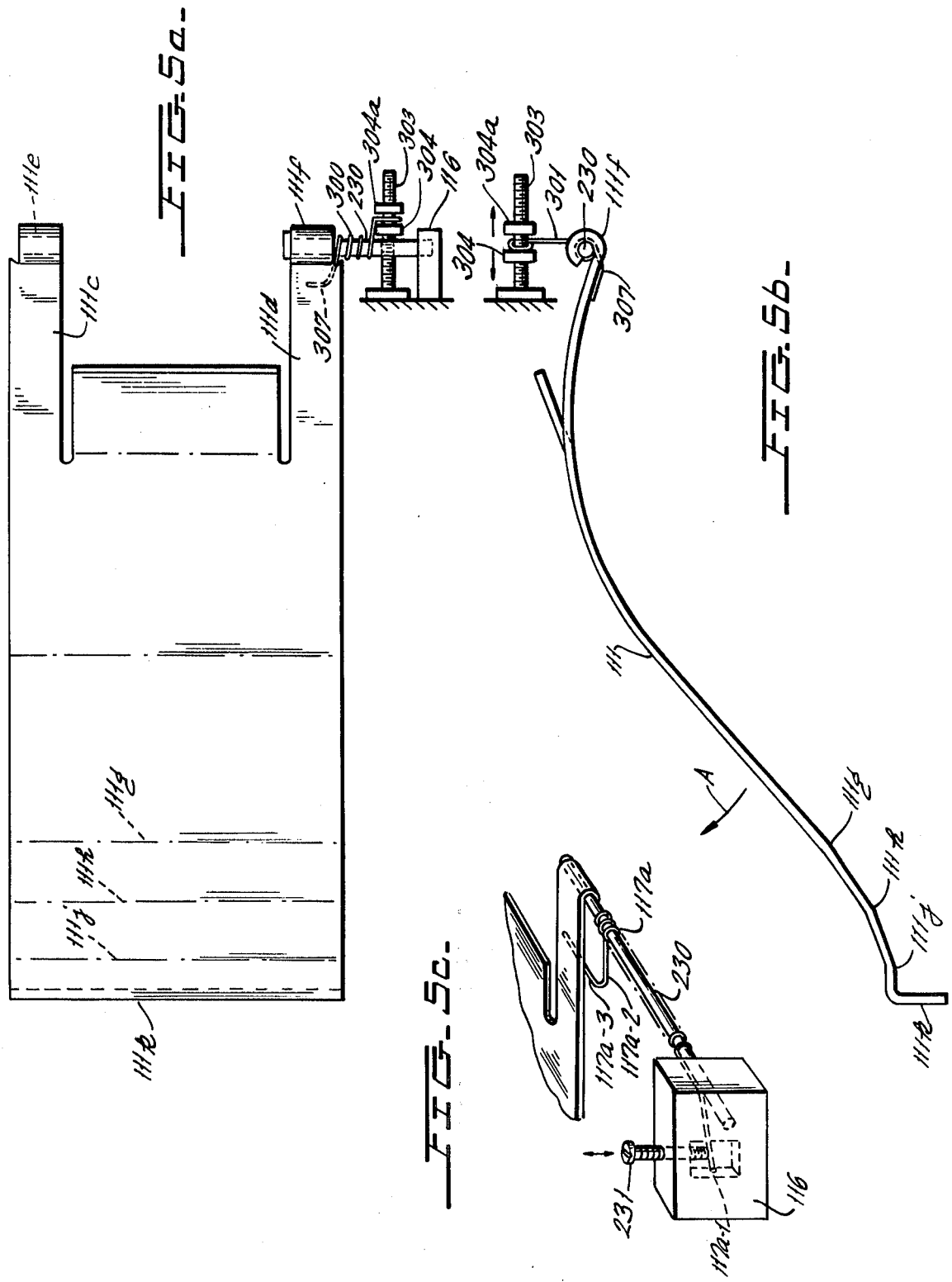

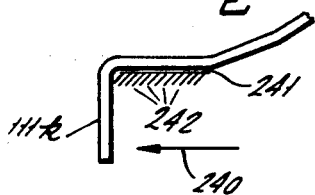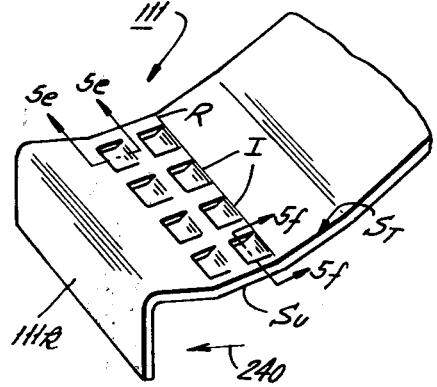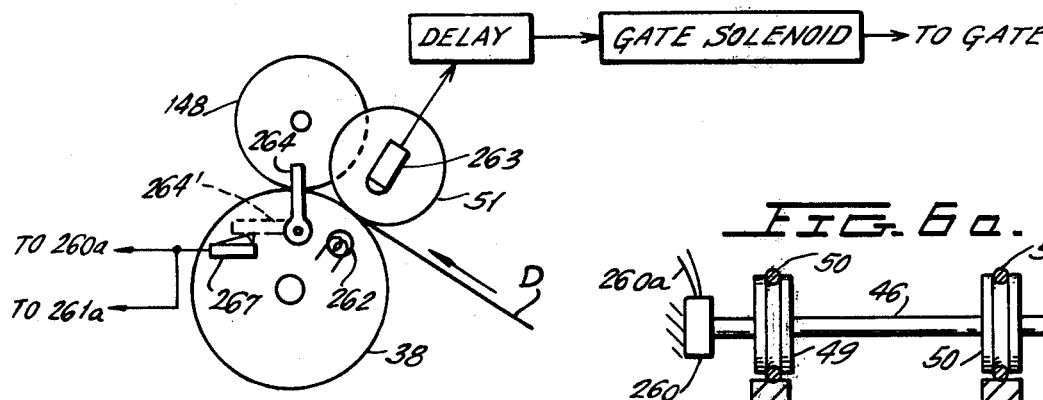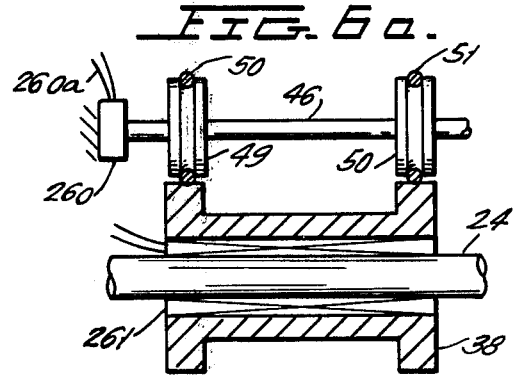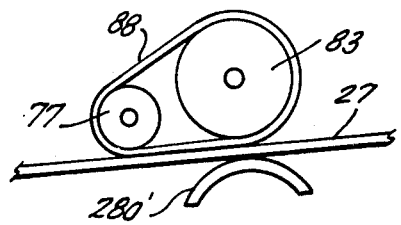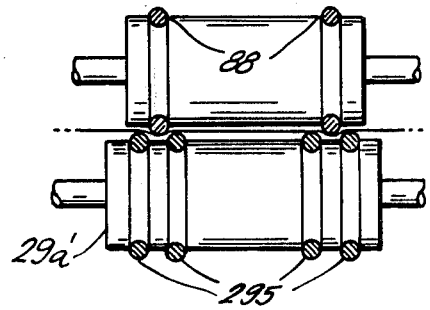

DOCUMENT COUNTER

This is a division, of application Ser. No. 618,280 filed Sept. 30, 1975.

BACKGROUND OF THE INVENTION

There exist a large number of applications wherein it is desired to provide a capability of counting and/or endorsing or canceling documents such as tickets, paper currency, food stamps, and the like. Since many applications require counting devices having a capability of counting documents accurately and at high speeds, apparatus is required which not only meets these specifications, but is futher capable of counting and stacking documents of which many may be mutilated, or creased or otherwise abused due to folding or rough handling. Typically, damaged or mutilated documents must first be removed from a stack due to the fact that present day feeding and separating devices are incapable of handling and accurately counting such documents. Even documents which may be perfectly intact, but which may be either severely folded or creased typically require special handling.

It is also desirable to provide apparatus capable of performing the above-mentioned functions and which is further designed, without the need for repeated adjustments, to handle documents of varying length, width, thickness and finishes, as well as being capable of handling documents of different materials, and which may be creased either slightly or severely or have slight or severe tears.

A document handling device which provides all of the above capabilities typically results in apparatus which is large, expensive and complicated.

BRIEF DESCRIPTION OF THE INVENTION

The present invention is characterized by providing novel stacker means employed in apparatus of the type described and which achieves all of the above capabilities as a result of a design and arrangement which yields apparatus which is small, compact, light and hence portable and is also characterized by its simplicity of design and operation and reduced cost.

The apparatus of the present invention is comprised of an infeed conveyor section so oriented as to enable a stack of documents to be effectively bottom fed into a machine for processing without the need for a top weight. The rear portion of the infeed conveyor is inclined to relieve the bottom-most document from the weight of the stack as it is being moved into the apparatus. Eccentric jogging means is driven by and cooperates with a pair of conveyor belts in driving the bottom-most document in the forward feed direction. A forward support plate of the infeed conveyor is inclined in such a fashion as to relieve the forward end of at least the bottom-most document from a significant portion of the weight of the stack further enhancing the feed operation.

Documents enter into the apparatus through a narrow tapered throat, the upper guide member of the throat being inclined at an angle which contributes toward the feed of single documents into the apparatus while preventing documents from becoming wedged in the throat portion.

The conveyor belts cooperate with associated backing drive wheels (or a stationary support) to serve as the drive means for feeding documents in the forward feed direction in the stripping phase of the operation. Positioned immediately above the drive wheels is at least one stripper assembly comprised of first and second pairs of stripper rollers each positioned immediately above one of the drive belts. The up-stream stripper rollers are larger in diameter than the down-stream stripper rollers and are swingably mounted in a "floating" fashion. The down-stream stripper rollers are mounted to rotate in a freewheeling fashion about a fixed shaft. Rotational drive is coupled from the up-stream stripper rollers to the downstream stripper rollers by means of a plurality of flexible resilient O-rings which serve the multiple functions of: urging the up-stream stripper rollers downwardly toward the drive rollers which are beneath the drive belts; imparting drive to the downstream stripper rollers: providing an elongated stripping surface for more effective stripping action: and also cooperating with the conveyor belts to "corrugate" incoming sheets to enhance the stripping action.

The conveyor belts are preferably provided with a toothed profile and are further provided with continuous elongated grooves which are aligned with the above-mentioned O-rings of the stripper assembly to provide the corrugating action. The conveyor belts may be replaced by a plurality of O-rings, if desired.

The materials of the O-rings and the conveyor belts are selected so that the coefficient of friction of the conveyor belts is greater than the coefficient of friction of the O-rings whereby single sheets fed therebetween are driven in the forward feed direction since the conveyor belts exert the major influence on single fed sheets. In the case of double or multiple fed sheets entering between the drive and stripper assemblies, the coefficient of friction between adjacent sheets is less than both the coefficient of friction of the O-rings and the drive belts causing the bottom-most sheet to be fed in the forward feed direction while the sheets thereabove, engaging either one another or engaging the O-rings, are fed in the upstream direction assuring that only single sheets pass downstream from the drive and stripper assemblies.

The single fed sheets pass downstream from the drive and stripper assemblies until the downstream edges thereof enter between cooperating idler acceleration wheels and a driven platen roller which abruptly accelerates the single sheet fed therebetween causing a gap to be formed between the trailing edge of this document and the leading edge of the next document fed downstream from the drive and stripper assemblies. A cooperating light source and photodetector means are mounted on opposite sides of the path of moving documents in the region of the acceleration and platen rollers. The gaps formed between successively fed documents permit light to pass from the lamp source to the photocell providing a pulse which serves to count the documents.

The platen roller cooperates with engaging idler type acceleration wheels to feed documents into an outfeed stacker. Documents passing into the region between the acceleration and platen rollers are guided along an upwardly inclined path. As the downstream edges of documents pass from the acceleration rollers and platen roller they strike a gently downwardly curved swingably mounted stacker plate. The base of the outfeed stacker, positioned substantially below the incoming path of documents, prevents the upstream ends of documents fed into the stacker from causing interleaving of documents fed into the stacker, as well as preventing documents reaching the stacker from jamming or otherwise interfering with a smooth stacking operation. The swingably mounted stacker plate is pivotally mounted at its upstream end while its downstream end which limits the forward movement of abutting documents, is free to be lifted as the height of documents in the outfeed stacker increases to apply a slight top weight to the forming stack. The stacker plate is provided with a means to prevent stacked documents from rebounding after striking the downstream end of the stacker plate.

The apparatus is capable of counting documents at speeds of the order of 800 per minute and has a further capability of batching wherein batches of selected quantities of documents may be formed.

BRIEF DESCRIPTION OF THE FIGURES AND OBJECTIVES

It is therefore, one object of the present invention to provide a stacker in a highly simplified apparatus for accurately feeding, separating, counting and stacking documents which is characterized by its simplicity of design.

Still another object of the present invention is to provide a novel outfeed stacker assembly for document counting devices and the like in which the stacker is designed to prevent documents being accumulated in the stacker from interfering with documents subsequently fed thereto so as to prevent jams or interleaving of the documents and to assure the formation of a neat stack.

The above, as well as other objects of the present invention will become apparent when reading the accompanying description and drawings in which:

FIG. 1 shows a perspective view of a document counter embodying the principles of the present invention.

FIG. 2a is an elevational view of the document counter of FIG. 1 with the cover removed so as to show the contents of the counter.

FIG. 2b is a top plan view of the apparatus of FIG. 2 showing some of the components therein in greater detail to better explain the drive train of the document counter.

FIG. 2c shows a top plan view of the apparatus of FIG. 2a with most of the elements of FIG. 2b excluded therefrom to further show the structure and facilitate an understanding of the operation of the device.

FIG. 2d shows an elevational view of the appartus of FIG. 2a looking in the direction of arrows 2d—2d of FIG. 2a.

FIG. 2e shows a top plan view of the acceleration and stripper roller assemblies of FIG. 2a in greater detail.

FIG. 2f shows a simplified elevational view of the conveyor belt assembly of FIG. 2a.

FIG. 2g is a detailed elevational view showing a portion of the endorser assembly.

FIGS. 3a and 3b show detailed top and side views of the stripper assembly of FIG. 2a.

FIG. 3c shows a sectional view of the stripper assembly looking in the direction of arrows 3c—3c of FIG. 3b.

FIGS. 3d and 3e show detailed sectional views of embodiments of the cooperating O-rings and conveyor belt to explain the corrugating effect obtained.

FIGS. 3f and 3g show elevational and top plan views respectively of the preferred embodiment of the flexible drive means.

FIGS. 3h and 3i show alternative embodiments for limiting rotation of the stripper assembly to only one direction.

FIGS. 4a and 4b show top and side views of the acceleration idler roll assembly.

FIGS. 5a and 5b show detailed top and side views to the stacker plate of FIGS. 1 and 2a.

FIG. 5c shows an exploded perspective view of alternative biasing apparatus for the stacker plate of FIG. 2a.

FIGS. 5d and 5g show embodiments for assuring the formation of a neat stack.

FIGS. 5e and 5f show sectional views looking respectively in the direction of arrows 5e—5e and 5f—5f of FIG. 5d.

FIGS. 6a and 6b show views of a registration apparatus which may be employed in the device of FIG. 1.

FIG. 6c shows an alternative arrangement for the drive wheels of FIG. 2a.

FIG. 6d shows an alternative arrangement for the drive belts of FIGS. 3d and 3e.

DETAILED DESCRIPTION OF THE INVENTION

FIG. 1 shows a perspective view of the counting apparatus 10 of the present invention comprised of a housing 11 which, in addition to providing a protective function for the apparatus contained therein, further has a configuration which contributes to the effective operation of the apparatus. The infeed section 12 of the device is adapted to receive a stack of documents of intermixed sizes, finishes and thicknesses, and which requires no top weight, for rapidly and accurately feeding documents in to the separating and counting mechanism contained within housing 11. After the counting and/or endorsing operations, documents are fed into the outfeed stacker section 13 designed to prevent improper interleaving and/or jamming of documents fed thereto, to assure the development of a neat stack.

The front panel 11a of housing 11 serves as a control panel provided with BATCH/COUNT selector knob SW1 and an LED display D which provides a cumulative count of the documents fed through the apparatus. The display D is designed to "flash" to indicate certain conditions. Power ON switch SW2 selectively turns the apparatus ON or OFF. RUN/STOP switch SW3 has a stop position for turning the drive motor off without turning off the display while maintaining the number in the display. In the RUN position, counting is resumed without resetting the display. Display reset switch SW4 resets the display and clears any jam conditions. A detailed description of the electronics is set forth in copending application Ser. No. 613,633 filed Sept. 15, 1975 and assigned to the assignee of the present invention, and has been omitted herein for purposes of simplicity.

FIG. 2a shows an elevational view of the mechanism contained within housing 11.

The infeed stacker section is comprised of a first inclined plate 14 having a large V-shaped notch 14a to facilitate insertion of a stack S of documents. The plate is bent at 14b with its downstream end 14c being inclined only slightly relative to an imaginary horizontal plane. The downstream end of the plate is provided with three substantially rectangular-shaped notches 14e, 14f and 14g (FIG. 2c) which provide clearance for the conveyor belts and eccentrically mounted jogger wheel (to be more fully described) which elements respectively protrude therethrough.

The infeed hopper section is further comprised of an inclined plate 15 bent at 15a to form a lower oppositely inclined portion 15b. Upper portion 15 of the plate serves to relieve a major portion of the weight of the stack S from the forward ends of the bottom-most documents resting upon plate 14 due to its orientation. Section 15b forms a tapering throat portion with the conveyor belts through which documents are urged into the apparatus from the stack S provided in the infeed hopper. The angle which plate portion 15b defines relative to the feed path of the sheets is selected to be small enough to prevent rebounding of sheets therefrom and large enough to prevent wedging of the sheets moving between the conveyor belts and the plate portion 15b.

The mechanical drive for the apparatus is derived from a single motor means M secured to the base plate 11e of the housing frame by fasteners F. The output shaft of motor M is fitted with a hub H imparting drive to a pulley 16 (see FIG. 2b) by belt 17. Pulley 16 is mounted upon a shaft 18 which is journalled within bearings 19a and 19b provided in a pair of vertical support members 20a and 20b forming part of the apparatus supporting structure. Shaft 18 is adapted to rotate with pulley 16, secured thereto by set screw 16a. Rotation of pulley 16 is imparted to shaft 18 which serves to rotate a pulley 21. A belt 22 is entrained by pulley 21 and a pulley 23 fixedly secured to shaft 24 by set screw 23a. Shaft 24 is freewheelingly rotated within bearings 25a and 25b mounted within uprights 20a and 20b respectively. Also mounted to shaft 24 on opposite sides of plates 20a and 20b are first and second crowned rollers 26a and 26b secured to shaft 24 by set of screws 27a and 27b respectively. The aforesaid members which constitute the drive-train between the output of motor M and shaft 24 also serve as a speed reducing means. The drive imparted to shaft 24 and pulleys 26a and 26b is imparted to a pair of crowned drive rollers 29a and 29b and a pair of crowned rollers 30a, 30b for rotating eccentric jogger 35 (to be more fully described) by a pair of elongated conveyor belts 27 and 28 each of which are respectively entrained about pulleys 26a, 29a, 30a and 26b, respectively to impart rotation to rollers 29a, 30a and 29b, 30b. Rollers 26a, 26b, 29a, 29b, 30a and 30b are crowned to retain the belts 27, 28 thereon. Rollers 29a and 29b are mounted upon shaft 31 which is journalled within bearings 32a and 32b provided in upright walls 20a and 20b. In a similar fashion, rollers 30a and 30b are joined to shaft 33 rotatably mounted within bearings 34a and 34b. Jogger roller 35 is eccentrically mounted upon shaft 33 between rollers 30a and 30b and is provided with grooves formed in the cylindrical surface thereof for receiving O-rings 36 which periodically engage the undersides of the bottom-most documents in the stack and perform the dual function of urging the bottom-most document in the forward feed direction while jogging the stack upwardly to relieve a substantial amount of the weight of the stack from at least the bottom-most document to facilitate the feeding operation. This operation and the function of plates 14 and 15 are fully described in U.S. Pat. No. 3,771,783 and a detailed description will be omitted for purposes of simplicity. Briefly, however, the more steeply inclined portion of plate 14 relieves the trailing edge of a document moving in the forward feed direction from the weight imposed upon the document by the upstream end of the stack. The upper portion of plate 15 exerts a supporting force on the forward edges of documents engaging the plate which has an upward vertical component, thereby relieving the forward end of at least bottom-most document from some of the weight of the downstream end of stack S.

As shown in FIGS. 2a, 2b and 2f, the closed loop conveyor belts 27 and 28 are entrained about the drive rolls 26a–26b and eccentric jogging member rolls 30a–30b. Each belt, such as, for example, belt 27 may be provided with a continuous sawtooth configuration along its exterior surface as shown by the section 27a of FIG. 2f. The belts are further provided with elongated continuous grooves running transverse to the sawtooth pattern. Note FIG. 3c in which belt 28 (shown in cross-section) is provided with grooves 28b and 28c which are aligned with the O-rings (to be more fully described) of the stripper assembly. These O-rings enter at least partially into the grooves 28b and 28c to "corrugate" or otherwise urge a paper document into an undulating configuration as shown by the document D; of FIGS. 3c and 3d which "corrugation" stiffens the sheets and thereby facilitates the stripping operation as will be described in detail hereinbelow.

The platen roller shaft 24 imparts rotation to drive rolls 26a and 26b and to the platen roller 38, shown best in FIGS. 2a, 2b and 4a. This roller rotates with the rotation of shaft 24 and imparts rotation to the acceleration idler wheels through frictional engagement there between as can best be seen from FIGS. 2a, 4a and 4b. The acceleration idler wheel assembly 40 is comprised of a mounting plate 41 formed of a suitable spring steel and provided with openings 41a and 41b for securing plate 41 to a structural cross-piece 43 (shown best in FIGS. 2a and 4b) by fastener 41c. Mounting plate 41 is provided with two arms 41c and 41d each of which mounts a bearing block 44 and 45 thereto. The bearing blocks are each provided with bearings 44a and 45a for supporting and freewheelingly mounting shaft 46. Shaft 46 is held within the bearings and prevented from linear movement by means of the collars 47 and 48 secured to shaft 46 and positioned on opposite sides of their associated bearing blocks 44 and 45 which, as shown, for example, in FIG. 4b, are each secured to an associated arm, such as, for example, arm 41d, by fastening means 48.

A pair of pulleys 49 and 50 are locked to shaft 46 and are each provided with circular grooves around their peripheries for receiving a cooperating resilient O-ring 51 and 52 respectively. As can best be seen in FIGS. 2a and 4b, the arms of mounting member 41 urge the O-rings of pulleys 49 and 50 against the surface of platen roller 38 so as to be rotated thereby. Platen roller 38 is preferably formed of a resilient material.

A flexible drive assembly 51 (FIGS. 4a and 2e), provided with a first collar 51a, is locked to one end of shaft 46 by means of a set screw 51b. One end of the flexible cable 51c is joined to collar 51a by a set screw 51d. The opposite end of flexible cable 51c is joined to a similar collar 52 by set screw 52a. Collar 52 is mounted to freewheelingly rotate about a bearing 53 secured to the apparatus side frame 54. A pulley member 55 is mounted to side frame 54 by means of bearing assembly 56 and is comprised of first and second integral pulley portions 55a and 55b, both of which are provided with semicircular grooves about their peripheries for receiving and supporting resilient O-rings 57 and 58. O-ring 57 rollingly engages the surface of collar 52 so as to drive pulley assembly 55 into rotation. Pulley portion 55b couples its rotational drive to a pulley 59 by means of O-ring 58 which is entrained about pulley portion 55b and pulley 59. The pulley assembly 59 is provided with a collar portion 59a which secures one end of a flexible drive cable 60 by means of set screw 59b. The opposite end of flexible drive cable 60 is secured to a collar 61 by set screw 61a. Collar 61 is mounted upon the shaft 71 of the stripper assembly 70 and is locked thereto by set screw 61b.

FIGS. 3f and 3g respectively show elevational and top plan views of another preferred embodiment of the flexible drive means of FIG. 2e. The collar 52a of flexible cable 51c is mounted to rotate upon bearing 53 which, in turn, is mounted to frame 54. The surface of member 52a is grooved to seat O-ring $O_1$, which is entrained about collar 52a and a groove in pulley $P_1$, which is freewheelingly mounted to side frame 54 by bearing $B_1$. The reduced diameter portion $P_{1a}$ frictionally engages C-ring $O_2$ seated within a groove in pulley $P_2$ freewheelingly mounted to swingable arm $S_1$ by bearing $B_2$. Arm $S_1$ is pivotally mounted to side frame 54 by fastening means F. The pulley member $P_2$ has a reduced diameter portion $P_{2a}$ provided with a pair of grooves for seating O-rings $O_3$ and $O_4$, which are further entrained about collar $C_1$ having a similar pair of spaced grooves for receiving O-rings $O_3$ and $O_4$. The collar $C_1$ is freewheelingly mounted to side frame 54 by bearing $B_3$. The collar $C_1$ is secured to flexible drive member 60.

The O-rings $O_3$ and $O_4$ are under sufficient tension to urge swingable arm S, in the direction shown by arrow A to maintain O-ring $O_2$ and pulley portion $P_{1a}$ in intimate engagement. Rotational drive is imparted to collar 52a by flexible drive member 51c. A first stage of speed reduction is provided by collar 52a and pulley $P_1$. A second stage of speed reduction is provided between reduced diameter portion $P_{1a}$ of pulley $P_1$ and the pulley $P_2$, as well as providing "slip clutch" action when necessary.

The stripper assembly 70 (see FIGS. 3a–3c) is comprised of a bracket 72 slotted at 72a and 72b for receiving threaded fastening members to join bracket 72 to the top of cross-piece 43 shown in FIG. 2a. The bracket is bent upwardly at 72c and has a pair of downwardly depending arms 72d and 72e. Arm 72e is shown best in FIGS. 3b and 3c and is provided with a first opening for supporting and threadedly engaging the threaded end 73a of stripper adjustment shaft 73, a second opening for supporting one end of stripper pivot shaft 74 and a third opening for supporting one end of shaft 75 upon which the downstream stripper pulleys are mounted. Arm 72d has similar openings aligned with the openings in arm 72e to support the opposite ends of shafts 73, 74 and 75. Downstream stripper pulleys 76 and 77 are secured to freewheeling shaft 75 on the exterior side of brackets 72a and 72e by means of set screws 76a and 77a.

The stripper pivot shaft 74 has each of its ends secured to the bracket arms 72d and 72e as shown best, for example, in FIG. 3c by means of a threaded fastener 78. A cylindrical bushing 79 is mounted between bracket arm 72e and upright arm 80a of swingable bracket 80 to facilitate pivoting of this bracket. Swingable bracket 80 is provided with a first pair of upright arms, there being a substantially mirror image of the upright arm 80a. Both of these arms are provided with openings for receiving the stripper pivot shaft 74. Note, for example, FIG. 3b in which stripper pivot shaft 74 and bushing 79 extend through an opening in upright arm 80a. The bracket extends generally downwardly and to the right, relative to FIG. 3b and is provided with a second pair of upright arms 80c and 80d shown in FIG. 3a. Arm 80c is shown in detail in FIG. 3c and is fitted with a bearing 31 for freewheelingly supporting the shaft 71 upon which the upstream stripper pulleys 82 and 83 are mounted. Each of these pulleys is provided with a set screw 82a and 83a respectively for locking the pulleys to shaft 71. The upper end 80e of swingable bracket 80 is bent at an angle relative to the main portion of the bracket and is provided with an opening for receiving set screw 85 threadedly secured to swingable bracket portion 80c by means of a threaded collar 86 which is welded or otherwise secured to swingable bracket portion 80e and aligned with the opening provided therein. Set screw 85 is adapted to have its right-hand end (relative to FIG. 3b) bear against intermediately located tapered portion 73b of stripper adjustment shaft 73.

The stripper pulleys 77 and 83 are each provided with a pair of aligned grooves for receiving and supporting resilient O-rings 88. Similarly, stripper pulleys 76 and 82 are provided with similar semicircular shaped grooves for receiving and positioning O-rings 89. The O-rings of the stripper assembly may have a circular cross-section as shown in FIG. 3d or may have a rectangular or square cross-section as shown in FIG. 3e. The O-rings serve to urge pulleys 82 and 83, mounted upon swingable bracket 80, in the clockwise direction (relative to FIG. 3b) about the pivot shaft 74. Movement in the clockwise direction is limited by the abutment of the right-hand end of set screw 85 against the tapered portion 73b of paper adjustment shaft 73. In order to adjustably limit movement in the clockwise direction, stripper adjustment shaft 73 may be rotated by its knurled control knob 73c, locked to shaft 73 by set screw 73d causing the threaded portions 73a to rotate within a tapped member 87 secured to bracket arm 72e. Rotation in the clockwise direction, as shown by arrow 89, causes shaft 73 to move in the linear direction shown by arrow 92. Rotation in the counterclockwise direction, as shown by arrow 90, causes shaft 73 to move in the linear direction shown by arrow 91. This moves the tapered portion 73b of shaft 73 relative to set screw 85 to control the positioning of pulleys 82 and 83 relative to the conveyor belts 27 and 28.

The stripper assembly of FIG. 2e differs from that shown in FIGS. 3a–3c in that the pulleys 76, 77 and 82, 83 are equal in diameter and the downstream rollers 76 and 77 are swingably mounted. The collar 61b may be mounted to the common shaft 75 upon which the rollers 76 and 77 are mounted, if desired.

The stripper assembly may be provided with a one-way clutch assembly to permit unimpeded rotation of rollers 82, 83 in the direction which causes the lower run of O-ring pairs 88, 89 to move in the opposite direction of the upper run of drive belts 27 and 28 to perform the desired stripping action, while preventing rotation in the reverse direction in the event of a jam condition.

As shown in FIG. 3a a SPRAG clutch is mounted upon shaft 71 and is provided with a mounting bracket 212 whose arms 212a and 212b are secured to bracket 72. FIG. 3i shows an end view of SPRAG clutch 211 and shaft 71. When shaft 71 is rotating in the proper direction shown by arrow 214, the SPRAG clutch permits unimpeded rotation thereof. In the event of a jam, (i.e., where a number of sheets become wedged between the stripper O-rings and the drive belts, the drive belts tend to urge the stripper assembly O-rings and hence pulleys 82, 83 and shaft 71 in the reverse direction as a result of the documents wedged therebetween). The reverse rotation of shaft 71 is prevented by SPRAG clutch 211 thereby holding shaft 71 and hence pulleys 82, 83 and O-ring pairs 88, 89 at a standstill. The frictional drive between collar 52 and O-ring 57 (FIG. 2e) also operates as a slip clutch. The relative motion between the motionless O-ring pairs 88, 89 and the moving drive belts 27, 28 permits the stripping action of the O-rings 88, 89 to be maintained (due to relative movement between the O-rings and the drive belts) even in the presence of the jam condition.

FIGS. 3b, 3c and 3h show another type of one-way clutch means 220 which may be substituted for the SPRAG clutch 211. The one-way clutch means is comprised of a screen 221 (FIGS. 3b and 3c) secured to the outer surface of arm 72e supporting upstream shaft 71. A disc shaped cooperating fibre-faced clutch member 222 (FIG. 3h) having a backing 222a is secured to the surface 82a of pulley 82 which surface is adjacent to the outer surface of arm 72e. The outer surface of backing 222a is provided with a multitude of oriented stiff fibres 222b all arranged to form an acute angle with the plane of backing 222a. When the stripper pulley is rotating in the proper direction, the fibres 222b freely slide against screen 221. Upon the occurrence of a jam, the documents wedged between the stripper O-rings 88, 89 and the drive belts attempt to rotate the pulley 82 in the reverse direction causing the free ends of the fibres to enter into the openings in screen 221. Since the fibres are stiff, they lock the pulley 82 to prevent pulley 82, shaft 71 and pulley 83 from reversing their direction of rotation to bring shaft 71, pulleys 82, 83 and O-ring pairs 88, 89 to a standstill, thereby providing continued stripping action as was described hereinabove with regard to the one-way clutch embodiment of FIG. 3i. The motionless O-ring pairs 88 and 89 continue to provide stripping action due to the relative movement between drive belts 27, 28 and the O-ring pairs 88, 89.

The operation of the apparatus is as follows:

Considering FIGS. 2a and 2b, the motor output shaft and the hub H rotate in the counterclockwise direction, as shown by arrow 92, rotating pulley 16 in the counterclockwise direction, as shown by arrow 93, through pulley belt 17. Shaft 18 is driven in the counterclockwise direction to drive the pulley 21 at its opposite end (see FIG. 2b) in the counterclockwise direction to drive the pulley 23 in the counterclockwise direction, as shown by arrow 94. This rotation is imparted to shaft 24 and crowned rollers 26a and 26b to cause the crowned drive rollers 29a and 29b and shaft 31 as well as the crowned drive rollers 30a, 30b and shaft 33 to likewise be rotated in the counterclockwise direction as shown by arrows 95 and 96 respectively, linearly moving the upper runs of conveyor belts 27 and 28 in the direction shown by arrow 97 (see FIGS. 2a and 2b).

The rotation of the pulley 23 is imparted to the platen roller 38 through shaft 24 causing the platen roller to rotate in the counterclockwise direction shown by arrow 94. Drive is imparted to the idler acceleration pulleys 49 and 50 of FIG. 4a (only pulley 50 being shown in FIG. 2a) by the frictional rolling engagement between the surface of platen roller 38 and O-rings 51 and 52 of the acceleration idler pulleys 49 and 50 respectively. This causes the acceleration pulleys to rotate in the clockwise direction as shown by arrow 99 in FIG. 2a. This rotational drive is coupled through flexible drive 51, pulley assembly 55, pulley 59 and flexible drive assembly 60 to rotate the upstream stripper pulleys 82 and 83 in the counterclockwise direction as shown by arrow 101. The downstream stripper pulleys 76 and 77 are rotated in the counterclockwise direction as shown by arrow 102 by means of the O-ring pairs 88 and 89.

The eccentrically mounted pulley 35 is rotated in the counterclockwise direction as shown by arrow 96. This pulley does not impart any vibration or movement to conveyor belts 27 and 28 in a direction transverse to the upper and lower runs of the belts to assure more positive feeding of documents by belts 27 and 28.

A stack S of documents to be counted is set into the infeed hopper 12. The bottom-most document undergoes frictional engagement with the O-rings 36 of eccentric pulley 35 which, in addition to driving the bottom-most document in stack S in the direction shown by arrow 97, also jogs the stack upwardly, to periodically "loosen" the documents, which action assists in relieving the bottom-most document of the weight of the stack. The eccentric pulley 35 and conveyor belts 27 and 28 cooperate to drive the bottom-most document into the tapered throat portion formed by the upper run of the conveyor belts and plate portion 15b so that the bottom-most document (or documents) enters between the lower runs of the stripper assembly O-rings 88 and 89 and the upper runs of the conveyor belts 27 and 28. Plate portion 15a is inclined at an angle small enough to cause the forward edges of documents to slide downwardly therealong without being rebounded therefrom and also large enough to prevent wedging of the documents in the throat portion. The outer circumference of the 88,89 entrained about pulleys 82 and 83 is made substantially tangential to plate portion 15a for the same reason.

The angle of the infeed throat defined by O-rings 88,89 and the upper run of conveyor belts 27,28 may be adjusted in any desirable manner. For example, the angle may be adjusted by adjusting the diameter of upstream rollers 82,83. It is preferred that the diameter of upstream rollers 82,83 be greater than the diameter of downstream rollers 76,77 and that the angle of the infeed throat be in the range from 30 to 60 degrees.

In the case where a single document passes therebetween, the coefficient of friction between the bottom surface of the document and the conveyor belts 27 and 28 is greater than the coefficient of friction between the top surface of the document and the O-ring pairs 88 and 89 causing the conveyor belts to exert the overriding force upon the paper document, driving it in the downstream direction as shown by arrow 97. The O-rings of pulleys 82 and 83 at least partially enter into the grooves provided in the conveyor belts 27 and 28 (note especially FIGS. 3c and 3d) causing the paper document to assume a corrugated contour (see FIGS. 3c and 3d), to stiffen the document as it is being fed between the stripper O-rings and the conveyor belts to further facilitate handling thereof. The O-rings are substantially tangential to the surface of plate portion 15a of the infeed hopper and to the diameter of rollers 82 and 83 to provide an angle to incoming documents which prevents wedging and/or rebounding of incoming documents.

The single document continues to move in the forward feed direction between an upper guide plate 15c and lower plate 14d, guiding the downstream edge of the document diagonally upward along inclined plate 14d and enters into the nips formed by the O-rings 51 and 52 of the acceleration pulleys 49 and 50 and the platen roller 38, at which time (due to the diameter of platen roll 38 being greater than that of rolls 26a–26b) the document is abruptly accelerated to a linear speed greater than the linear speed experienced by the document as it moves between the stripper assembly O-rings and the upper run of conveyor belts 27 and 28.

The document follows the contour of platen roll 38 as it passes beneath leaf springs 194 and 194a and endorser roll 148, moving in the direction as shown by arrow 104 until the downstream edge strikes the undersurface of the pivotally mounted stacker plate 111 (see also FIGS. 5a and 5b), at which time the document is deflected downwardly, as shown by arrows 105 and 106, moving toward the left-hand end 111a of stacker plate 111 and forming a neat stack upon the base plate 112 of the outfeed stacker. The lower end of plate 111 rests on the forming stack S' (FIG. 1) to keep it neatly aligned.

The stacker plate is provided with a pair of arms 111c and 111d at its right-hand end (see FIGS. 2c, 5a and 5b) which are bent so as to form a pair of openings 111e and 111f for receiving short cantilever mounted shafts 113 and 114 secured within support blocks 115 and 116 respectively. Positioned about the shafts 113 and 114 are the torsion springs 117a and 117b which are mounted in such a way as to apply a clockwise bias (relative to FIG. 2a) upon the upper end of stacker plate 111, as shown by arrow B, generally urging the stacker plate 111 in the upward direction. In order to adjust the downward force of the stacker plate imposed upon the forming stack of documents, a narrow elongated plate 118 is mounted to stacker plate 111 by suitable fastening means and is spaced from the stacker plate by spacers 119a and 119b. A weight 120 is slidably mounted along the sides of plate 118 to move in either direction as shown by arrows 121 and 122 to counterbalance the biasing force of springs 117a and 117b and thereby adjust the weight of the downstream end of the stacker plate imposed upon the stack of documents being formed.

The weight 120 preferably 120a includes a permanent magnet member 120a which is magnetically attracted to the plate 118 to maintain the weight in position, once adjusted.

As an alternative arrangement, the weight 120 and slide 118 may be omitted and the torsion springs 117a and 117b are adapted to adjustably control the biasing force. As shown in the exploded view of FIG. 5c, torsion spring 117a encircles pin 230, one end of pin 230 being secured in block 116. End 117a-1 of spring 117a is positioned within a vertical slot (not shown) in block 116. A threaded opening 116a in block 116 receives threaded fastener 231, whose lower end projects into the aforesaid vertical slot and bears against spring end 117a-1. End 117a-2 extends substantially radially outward from the main body of spring 117a and is further bent so that its free end is positioned beneath arm 111c of stacker plate 111. Adjustment of screw 231 controls the weight exerted by stacker plate 111 upon the documents stack being formed. A similar structure is provided for spring 117b.

The arrangement of FIG. 5c may be replaced by the torsion spring 300 of FIGS. 5a and 5b. Spring 300 encircles pin 230 which is locked to block 116 (FIG. 5a). One arm 301 of spring 300 extends vertically upward and a few turns (302) are provided to encircle threaded elongated member 303. A pair of nuts 304–304a threadedly engage member 303 to move the upper end (i.e., turns 302) of spring 300 in either direction. The opposite end 305 of spring 300 is positioned beneath the arm 111d of stacker plate 111. Adjustment of nuts 304–304a thus controls the weight imposed upon the forming stack of documents by plate 111. If desired, an identical arrangement may be provided for arm 111e.

As can clearly be seen from FIG. 2a, documents enter the stacker at a height well above the supporting surface 112 of the outfeed stacker so that even though the upstream ends of previously stacked documents may be curled or bent or otherwise creased, documents subsequently entering into the outfeed stacker enter upon the stack well above the top-most document previously fed to the forming stack.

The stacker plate is further provided with three bent portions to form the substantially sharp vertices 111g, 111h, 111j. The free end is bent to form an end flange 111k. As documents enter the stacker they are guided towards flange 111k by the smooth curved surface provided along the underside of plate 111. When the stacker is empty or contains just a few documents, the vertex 111j serves to slow down the entering document and also serves to prevent the document from rebounding after its forward edge strikes the flange 111k. As the stack of documents builds up, plate 111 is lifted upwardly in the direction of arrow A whereupon vertex 111h now serves the function previously performed by vertex 111j. As the documents build up the stack still further, the vertex 111g serves the above functions.

The vertices 111g, 111h, 111j, of stacker plate 11 may be replaced by either the arrangement of FIGS. 5d–5f or the arrangement of FIG. 5g.

In FIGS. 5d the region R (donted by the dotted rectangle) is provided with a plurality of indentations I having a concave contour along the top surface $S_T$ of plate 111 and having a convex contour along the undersurface $S_u$ of the plate (see FIG. 5f). The downstream ends $I_e$ of the indentations are relatively sharp (see FIG. 5e). In operation, the documents move in the direction of arrow 240. (FIGS. 5d and 5e). The forward ends $I_f$ of the indentations provide relatively little resistance to their movement. When their downstream ends strike flange 111k the documents will rebound and thereby attempt to move in the reverse direction. The sharp forward edges $I_e$ which protrude below undersurface $S_u$ "grab" the documents to prevent rebounding thereby assuring the formation of a straight, even stack. The indentations of region R closely resemble the grating structure of a conventional kitchen grater.

FIG. 5g shows another alternative anti-rebounding embodiment in which a base sheet 241 is adhesively joined to the undersurface SU of plate 111. A large number of densely arranged stiff fibres 242 are joined to the opposite surface of base sheet 241. The fibres are inclined at an acute angle relative to an imaginary vertical axis so as to exert substantially little resistance to incoming documents moving in the direction of arrow 240. When the downstream edges of the documents strike flange 111k and attempt to rebound therefrom, the free ends of the stiff fibres 242 "grab" the document to prevent movement of documents in the reverse direction to assure the formation of a straight, neat stack.

A light source 130 which may for example, be an LED device (FIGS. 2a, 4b) is positioned immediately beneath an opening in plate 14d. Upper plate 15c and plate 14d are each provided with openings (not shown) substantially in alignment. A photodetector 131 is positioned immediately above the aforesaid openings (not shown) and light source 130 and detects light during the time interval in which it takes the trailing edge of a downstream document and the leading edge of the next upstream document to pass the light source and detector location. The gap between documents is caused as a result of the fact that each document is abruptly acclerated in passing from the position between the stripper assembly O-rings and the drive belts to the nips between platen roller 38 and acceleration idler O-rings causing a gap to be formed between the consecutively fed documents. This pulse is utilized to count the documents.

Assuming that a pair of documents are fed between the stripper assembly O-rings 88 and 89 and the drive belts 27 and 28, the friction between the bottom-most document and the drive belts 27 and 28 is greater than the friction between the bottom-most document and the upper document, causing the former document to be fed in the downstream direction shown by arrow 97. Similarly, the friction between the stripper assembly O-ring pairs 88 and 89 and the upper document is greater than the friction between the upper document and the bottom-most document, causing the stripper assembly O-ring pairs 88 and 89 to drive the upper document in the reverse direction, as shown by arrows 97a, toward the infeed hopper 112 thereby assuring that only one document will be fed in the downstream direction toward the cooperating platen roller 38 and the acceleration idler rollers 49 and 50. This stripping action is further enhanced by the "corrugating" of the documents fed between the stripper assembly O-ring pairs 88 and 89 and the drive belts 27 and 28, which corrugation actions serves to reduce the surface area of engagement between adjacent documents and hence the frictional engagement between the confronting surfaces of the documents. The documents engage one another at the points P shown in FIG. 3d, and are separated at the adjacent areas so as to reduce the effective surface area of frictional engagement between the confronting surfaces of the documents. The documents engage one another at the points P shown in FIG. 3d, and are separated at the adjacent areas so as to reduce the effective surface area of frictional engagement between double fed documents. The corrugating action stiffens the documents in the feed direction to further enhance the stripping action.

The stripping action is still futher enhanced by virtue of the fact that effective stripping action takes place over the substantially entire lower run $R_l$ of the stripper assembly O-rings as shown best in FIG. 3b to still further enhance the stripping action and thereby be assured that only single fed documents are moved downstream toward the cooperating acceleration idler rollers 49 and 50 and platen roller 38. Conventional strippers make very limited (almost "point") contact yielding limited stripping action, which "point" contact also causes the rollers to wear out at a faster rate. The entire lower run of O-rings serves as the active stripping surface significantly improving the stripping action as well as reducing the rate of wearing. In addition, stripper replacement as a result of wearing is limited to replacement of the inexpensive O-rings as opposed to replacement of the entire resilient roller of the prior art. The O-ring pairs 88 and 89 thus serve the multiple functions of providing a longer effective stripping region $R_L$ coupling drive from the upstream pulleys 82 and 83 to the downstream pulleys 76 and 77; urging the upstream pulleys 82 and 83 downwardly toward conveyor belts 27 and 28 and drive pulleys 29a and 29b which support the conveyor belts in the region immediately beneath pulleys 82 and 83 to provide positive sliding engagement with the documents; and further, due to their inherent geometry, cooperate with the pairs of grooves provided in the conveyor belts 27 and 28 to corrugate documents fed between stripper assembly O-ring pairs 89 and 90 and the conveyor belts 27 and 28.

Stripping action for extremely thin documents such as tissue type sheets may be greatly enhanced by increasing the spacing between the pulleys 26a and 30a (see FIG. 2f). The closed loop belts (i.e., belt 27) are greatly increased in circumference to be entrained about the aforesaid pulleys, to greatly increase the portion $R_1$ of the upper run of belt 27 to accomodate additional stripper assemblies. As shown in FIG. 2f stripper assembliies $SA_1$, $SA_2$, and $SA_3$ are provided, as shown by the dotted rectangles. A pair of drive wheels (or stationary sliding supports) may be provided beneath each stripper assembly, if desired. Each assembly SA may be of the type and design shown in FIGS. 3a and 3b and a detailed showing has been omitted for purposes of simplicity. Each stripper assembly may be adjusted to provide a different magnitude of stripping action. For example, the assemblies $SA_1$, $SA_2$, $SA_3$ may exert light, medium and heavy stripping action, respectively. Using a plurality of assemblies can assure positive stripping action of even the lightest, thinnest and flimsiest documents. Alternatively all of the assemblies may be adjusted to exert the same magnitude of stripping action or any other combination of magnitude of stripping force, if desired. Driving power for the stripper assemblies may be obtained by extending the axial length of pulley P2a (FIGS. 3f and 3g) to accomodate additional pairs of O-rings 245 and 246 (shown in dotted fashion in FIG. 3f) and which are similar to the pair O3-O4 of O-rings and by providing additional collars C1' and C1" (FIG. 3f) driven by the O-ring pairs 245 and 246 and coupling this drive to their associated stripper assemblies by flexible drives similar to drive 60 (FIG. 2e).

As was mentioned hereinabove, both the acceleration pulleys and the upstream stripper assembly pulleys are movably mounted to automatically adjust and compensate for documents of varying thicknesses and/or to compensate for thicknesses of double documents fed through the apparatus, creases or folds in documents, etc. The flexible drives 51 and 60 do not interfere with the "floating" nature of these mountings to assure their appropriate operation.

In the event that any jams occur within the mechanism, since the acceleration pulleys are idlers and are mounted upon a resilient bracket, the acceleration idlers are free to yield and also to "slip" when jammed documents pass between the acceleration idlers and platen roll 38 to either reduce or interrupt the drive to the stripper assembly, which slipping action supplements that obtained between pulley P1a and O-ring OZ (FIGS. 3f and 3g).

The combined speed-reduction and friction-drive assembly provided between collar 52 of flexible drive 51 and the O-ring 57 mounted on pulley portion 55a further serves as a slip clutch which slips in the event of a jam involving the stripper assembly in order to prevent these assemblies from being damaged in the event of a jam condition, or in the event of any lock-up in the stripper assembly.

The apparatus has a printing or "endorsing" capability comprised of endorser assembly 140 (see FIG. 2a) which is removable and/or replaceable as a self-contained sub-assembly. The endorser assembly includes a pair of plates 141 and 142 (note also FIG. 2d) maintained in spaced parallel fashion by a cross piece 143 and additional spacer rods (not shown) spanning between plates 141 and 142 and secured thereto by fastening members such as, for example, the fastening members 144, 145 and 146. The endorser assembly is further comprised of an endorser or printing roller 148, a transfer roller 149 and an inking roller 150. Inking roller 150 is mounted upon swingable rod 151 pivoted by pin 152 to the guide plate 141. The free end of arm 151 pivotally mounts inking roller 150 thereto by means of a shaft 153 and a split ring locking mechanism 154 which permits simple and rapid removal and replacement of the inking roller and which assembly is shown in detail in FIGS. 12a–12e of copending application Ser. No. 465,700 filed Apr. 30, 1974 and which has been omitted herein for purposes of simplicity.

Inking roller 150 is maintained in engagement with transfer roll 149 by means of overcenter spring 155 having a first end coupled to arm 151 by pin 151a and having a second end coupled to plate 141 by pin 141a. The inking roll 150 may be moved to the dotted line position 150' against the biasing force of spring 155 in order to rapidly remove and/or replace the inking roll. The inking roll is retained in the dotted line position 150' by overcenter spring 155 until maintenance is completed, at which time the inking roll may then be lowered to the solid line position 150 where over-center spring 155 again biases the ink roll into rolling engagement with transfer roll 149. The transfer roll is mounted upon a shaft 156 which is provided with a pair of bearings 157 and 158 mounted within elongated slots such as, for example, the elongated slot 142a provided in plate 142. A similar slot is provided in plate 141. The bearings 157 and 158 are provided with truncated surfaces such as the truncated surfaces 158a and 158b provided in bearing 158 so as to be slidably received within elongated slot 142. Bearing 157 is of a similar design and is received in slot 141a. A pair of springs 160 and 160a are secured between the underside of each bearing by stationary pins 161a and 161b secured to plates 141 and 142 (FIG. 2d) to urge the transfer roll in the diagonally downward direction and into engagement with the endorser roll 148. FIG. 2d shows biasing springs 160 and 160a having their upper ends secured to bearings 157 and 158 at 157c and 158c respectively as having their lower ends provided with a hooked portion secured to pins 161a and 161b. Springs 160 and 160a cooperate to urge transfer roll 149 generally diagonally downward and in sliding engagement with the endorser member 148.

The plates 141 and 142 are each provided with a pair of downwardly extending projections. For example, in FIGS. 2a, 2d and 2g plate 142 is provided with downwardly extending projections 142b and 142c arranged on opposite sides of elongated slot 142e for receiving one bearing 170 of the endorser roller assembly. The endorser roller assembly is mounted upon a shaft 171 with the bearing assemblies 170 and 172 being arranged at opposite ends thereof (note FIG. 2d) and each being provided with a pair of truncated surfaces. Note bearing 170 having truncated surfaces 170a and 170b which are slidably mounted within the slot 142e. A substantially U-shaped spring 173 has its yoke portion 173a secured to plate 140 by fastening member 172 and a pair of downwardly depending arms 173b and 173c whose free ends are bent inwardly (into the plane of the figure) and which extend through slots 142s in the projections 142b and 142c. The inwardly bent ends (see end 173d–FIG. 2d) are adapted to bear against the cylindrical periphery of bearing 170 to retain the endorser roll in position. To remove the endorser roll, the endorser assembly is lifted out of the apparatus and the endorser roll is simply pulled downwardly relative to the brackets 141 and 142 and against the inwardly directed biasing forces of the free ends of the spring arms to move these free ends away from the bearing to remove the bearing from slot 142e. The endorser roll may be replaced in a similar fashion simply by aligning the truncated surfaces of the bearings 172 and 170 with their associated slots, pressing the endorser into the slots to cause the free ends of the springs to move apart until they pass around the diameter of the cylindrical portions of the bearings and then move inwardly to grip the bearings and retain the endorser roll in position. The gripping forces exerted by the spring members 173 on the endorser bearing need not be great since the endorser roll is normally adapted to bear against platen roller 38 when in the engaged position. Thus, the platen roller 38 exerts an upwardly directed force against the endorser roller 148 which has a downwardly directed bias imparted thereto by the springs 160 and transfer roll 149 to maintain the ink transfer roll and the platen roll in rolling engagement with the endorser roll.

As shown in FIG. 2b, platen roller 38 may be provided with a plurality of grooves 200 about its periphery. Grooves 200 are aligned with raised print portions on endorser roller 148 in order that the raised print portions extend only partially into grooves 200. In this manner, the raised print portions never contact roller 38 even in the absence of a document and ink cannot be transferred from the raised print portion to platen roller 38. As a result of this structure there will be no "back printing" on subsequent sheets.

A rotatable locking plate 180 (FIGS. 1 and 2a) is pivotally mounted to the interior wall 190 by pin 181 and is provided with a sprial-shaped slot 182 for receiving the pin 183 secured to cross-piece 143. Pin 183 enters into radially aligned slot 182a. The locking plate 180 is then rotated counterclockwise (relative to FIG. 2d) by manually operable knob 184 positioned along the exterior wall of the housing (see FIG. 1) to move the left-hand portion of the endorser roll 148 into engagement with the platen roller 38. By rotating the locking plate 180 in the reverse direction, the endorsing assembly is moved generally upwardly so as to disengage and displace the endorser roll 148 from the platen roll 38 to prevent printing or endorsing of documents when desired.

In those cases when the endorsing assembly 140 is moved to the engaged position for printing, the endorsing roll 148 cooperates with platen roll 38 as an additional drive means for driving documents into the outfeed stacker 13.

In applications where no printing is desired, the document driving function performed by the cooperating endorser roll and platen roll 38 is replaced by a pair of leaf springs 194 and 194a (see FIG. 4b) mounted to the underside of cross-piece 43 by suitable fastening means on opposite sides of platen roll 38 and which are adapted to exert a downward force on the opposite sides of the platen roll 38 which cause the intermediate section of a paper document to be pressed against the platen roll 38 providing further driving force to passing documents.

The document handling device described hereinabove is designed to accomodate a variety of devices other than the endorser assembly, which devices are utilized to either "look at" or "act upon" passing documents. One device which "acts upon" documents is the endorser assembly, already described.

Devices which "look at" documents may for example, be a counterfeit detector (for detecting the authenticity of a document); a document reader or devices for detecting the content or pattern of magnetic, fluorescing, or other reactive material imbedded in or coated upon the document. Such devices may be used in a selective fashion by removing one such device (i.e., endorser assembly) and replacing the removed device with another device. Alternatively the run of the drive belts may be lengthened as described above to accomodate a plurality of devices arranged in tandem along the upper run of the drive belts. Preferably, the devices are mounted within housing 11 (FIG. 1) for easy removal and replacement. However, they may be more permanently mounted within the housing, if desired.

The platen roller 38 and acceleration rollers 49–50 (FIG. 4a) may be operated independently from the drive and stripper means for certain applications. Noting FIG. 6a, an electromagnetic clutch 260 is coupled to one end of the shaft 4b upon which the idler acceleration rollers 49 and 50 are mounted. An electromagnetic clutch 261 is mounted between shaft 24 (note also FIG. 2b) and platen roller 38. Leads 260a and 261 are connected to electrical control means. During normal operation, the clutch and brake are deenergized respectively causing platen 38 to rotate with shaft 24 and allowing idler rollers 49 and 50 to rotate under control of the platen, which engages O-rings 50 and 51. When the clutch and brake are energized, the clutch causes the platen roller to be freewheeling relative to shaft 24. The brake halts shaft 46 and the rollers 49 and 50 are locked thereto. The frictional engagement between O-rings 50, 51 and the platen roller, brings the platen roller to a standstill.

The above arrangement is extremely advantageous for use in printing upon documents when registration is required between the printed matter and the document. Noting FIG. 6b a light source 262 and cooperating light sensor 263 are arranged on opposite sides of the moving path of documents. Swingable gate 264 is normally in the blocking position. When a document moves between lamp 262 and sensor 263, a pulse is applied to delay circuit 265. After a predetermined delay, circuit 265 applies a trigger signal to gate solenoid 266, the delay period allowing the leading edge of document D to reach gate 264 and be stopped thereby. Gate solenoid 266 is activated to move gate 264 counterclockwise (relative to FIG. 6b) unblocking the path of movement of documents. When the gate moves to a substantially horizontal position 264' (shown in dotted fashion) microswitch 267 is activated to energize clutch 261 and brake 260. Platen roller 38 rotates to drive the document D positioned between idler rollers 49, 50 and platen roller 38. Endorser drum 148 is also driven into rotation.

As soon as the trailing edge of the document passes lamp 262, the light sensor removes the signal from delay circuit 265 to reset gate solenoid 266 and return gate 264 to the blocking position. Microswitch 267 is released, deenergizing clutch 261 and brake 260. Brake 260 abruptly halts shaft 46, rollers 49, 50, platen 38 and endorser drum 148 in readiness for printing on the next document. The raised printed matter is now in the proper position for printing on the next document and registration between the printed matter and the document is assured by bringing the document to a standstill (by gate 264) before initiating the printing operation. Delay circuit 265 may also be coupled to a similar clutch and brake mechanism for selectively stopping and starting the stripper and drive assemblies. The drive for the stripper assembly, previously taken from shaft 46, may be taken from shaft 24 to permit independent operation of the drive and stripper assemblies relative to the platen roller acceleration roller and endorser drum assemblies. The above arrangement may be used with "long" print surfaces such as are shown in FIGS. 7a–7d of copending application Ser. No. 617,035 filed Sept. 26, 1975, and which may be substituted for the drum 148.

Although the embodiment of FIGS. 2a and 2b teaches the employment of drive rollers 29a and 29b beneath the stripper assembly rollers 82 and 83 (see FIG. 3a), the rollers 29a and 29b may be completely eliminated or may be replaced by two plates (see plate 280 in FIG. 2f) each having a low friction surface 280a coated, for example, with TEFLON. The plates 280 may be curved as shown by plate 280' in FIG. 6c to reduce the amount to surface area engagement between plate 280' and belt 27.

As another alternative arrangement, document handling apparatus may utilize only one drive belt in place of the two drive belts shown in FIG. 2b. The single drive belt would preferably be centrally located. The eccentric jogger pulley would then preferably be replaced by two eccentric jogger pulleys positioned on opposite sides of the single drive belt. The single drive belt or the pair of drive belts may be replaced by plurality of O-rings. Also the width of the belt may be greater or less than the distance between cooperating O-rings. In the case where O-rings are used for both the drive and stripper assemblies, the number of O-rings employed in the stripper assembly may be greater than, equal to, or less than the number of O-rings employed in the drive assembly. Noting FIG. 6d, the drive pulley 29a is provided with grooves for receiving O-rings 295 (shown in cross-section). These O-rings cooperate with the O-rings 88 of the stripper assembly to "corrugate" document D. If desired, the O-rings of the stripper assembly may be replaced by a drive belt (or belts) and cooperate with O-rings substituted for the drive belts 27 and 28 so long as the coefficient of friction of the belts used in the stripper assembly is less than the coefficient of friction of the O-rings used as the forward feed means.

What is claimed is:

1. Apparatus for stacking sheets being fed thereto in seriatum comprising
    means for moving sheets towards said stacker along a feed path;
    said stacker comprising a base positioned a spaced distance below said feed path;
    a stacker plate having its upstream end positioned about said feed path and its downstream end resting upon said base a spaced distance from the upstream end of the base;
    said plate being curved to include a concave portion and a convex portion confronting the documents to guide the leading edge of documents along its bottom surface downwardly towards the downstream end of the plate to be stacked therebeneath;

means for swingably mounting the upstream end of said plate to enable the downstream end to move upwardly as the height of the stack increases;

said stacker plate including an end wall for limiting movement of said sheets in the feed direction;

said convex portion including at least two sharp bends each forming a vertex which engages the documents as they pass therebeneath to slow sheets down as they move in the feed direction and to stop sheets as they attempt to rebound from said end wall.

2. The apparatus of claim 1 further comprising a weight mounted for slidable movement along the upper surface of the plate for adjusting the magnitude of the downward force exerted upon the stack by the downstream end of said plate.

3. The apparatus of claim 1 wherein said mounting means further comprises biasing means for exerting a force on said plate tending to lift the downstream end upwardly from said stack and thereby adjusting the force exerted upon the forming stack by said stacker plate.

4. The apparatus of claim 1 wherein said at least two sharp bends form a parallel pair of vertices which selectively engage the documents as they pass therebeneath to slow sheets down as they move in the feed direction and to stop sheets as they attempt to rebound from said end wall;

the vertex closest to said end wall engaging documents as the stack is small and the vertices removed from the end wall successively engaging the sheets as the stack increases in height.

5. The apparatus of claim 1 wherein said antirebounding means comprises oriented fibre means for allowing sheets passing the fibre means in the feed direction to move substantially unimpeded towards said end wall to halt sheets attempting to rebound from said end wall.

6. The apparatus of claim 1 wherein said antirebounding means comprises a plurality of protrusions extending diagonally downward from the plate downstream end and towards the sheets passing therebeneath;

the free ends of said protrusions being substantially sharp to "grab" sheets attempting to rebound from said end wall.

* * * * *

UNITED STATES PATENT AND TRADEMARK OFFICE
CERTIFICATE OF CORRECTION

PATENT NO. : 4,146,218
DATED : March 27, 1979
INVENTOR(S) : Peter J. Loftus and John A. DiBlasio It is certified that error appears in the above-identified patent and that said Letters Patent are hereby corrected as shown below:

Column 6, line 5 after the word "the" insert --platen--.

Column 8, line 3 the number "31" should read --81--.

Column 8, line 11 the number "80c" should read --80e--.

Column 9, line 51 before "crowned" insert --eccentric--.

Column 10, line 32 after "the" insert --O-rings--.

Column 12, line 31 the word "donted" should read --denoted--.

Column 18, line 21 the word "climinated" should read --eliminated--.

Signed and Sealed this

Second Day of October 1979

[SEAL]

Attest:

RUTH C. MASON
Attesting Officer

LUTRELLE F. PARKER
Acting Commissioner of Patents and Trademarks